(12) United States Patent
Klode

(10) Patent No.: US 6,527,091 B2
(45) Date of Patent: Mar. 4, 2003

(54) ELECTRICALLY CONTROLLED ROTARY HOLDING DEVICE

(75) Inventor: Harald Klode, Centerville, OH (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/784,613

(22) Filed: Feb. 15, 2001

(65) Prior Publication Data
US 2002/0108822 A1 Aug. 15, 2002

Related U.S. Application Data
(60) Provisional application No. 60/229,378, filed on Aug. 31, 2000.

(51) Int. Cl.[7] .................................................. B60L 7/00
(52) U.S. Cl. ........................................ 188/164; 188/158
(58) Field of Search ............................. 188/72.1, 156, 188/158, 161, 164, DIG. 2; 310/105

(56) References Cited

U.S. PATENT DOCUMENTS

| | | | | |
|---|---|---|---|---|
| 3,577,157 A | * | 5/1971 | Robinson | 235/183 |
| 3,656,815 A | * | 4/1972 | Talebi et al. | 303/21 CG |
| 3,890,515 A | * | 6/1975 | Fehr et al. | 310/104 |
| 4,461,994 A | * | 7/1984 | MacDonald | 324/174 |
| 4,636,674 A | * | 1/1987 | Peterson | 310/155 |
| 4,713,567 A | * | 12/1987 | Fey et al. | 310/105 |
| 5,087,845 A | * | 2/1992 | Behrens et al. | 310/77 |
| 5,238,095 A | * | 8/1993 | Pedu | 192/84 R |
| 5,400,876 A | * | 3/1995 | Duncan | 188/158 |
| 5,510,708 A | * | 4/1996 | Shirai et al. | 324/174 |
| 5,679,993 A | * | 10/1997 | Oswald | 310/93 |
| 6,158,558 A | * | 12/2000 | Bill et al. | 188/162 |
| 6,161,659 A | * | 12/2000 | Maurice | 188/171 |

* cited by examiner

Primary Examiner—Christopher P. Schwartz
Assistant Examiner—Xuan Lan Nguyen
(74) Attorney, Agent, or Firm—Scott A. McBain

(57) ABSTRACT

The present invention provides a rotary holding device for an electrically actuated brake system in a vehicle including a rotor assembly including a plurality of teeth and a stator assembly including a plurality of teeth. The stator assembly teeth are positioned adjacent the rotor assembly teeth and a coil is positioned to allow a magnetic flux to align the rotor assembly teeth and the stator assembly teeth when the coil is energized to hold a motor shaft coupled to the device.

16 Claims, 2 Drawing Sheets

ELECTRICALLY CONTROLLED ROTARY HOLDING DEVICE

RELATED APPLICATIONS

This application claims the benefit of U.S. Provisional Application No. 60/229,378, filed Aug. 31, 2000, entitled Electrically Controlled Rotary Holding Device by Harald Klode.

TECHNICAL FIELD

The present invention relates to a rotary device that generates a holding torque when energized with a DC current. The device can be used to lower the electrical power consumption in an electro-mechanical brake system.

BACKGROUND OF THE INVENTION

Electric motor-driven wheel brakes for vehicles are known. When the brake system of a vehicle is designed with electric motor-driven brakes, special attention must be paid to the reliability with which a brake system of this type will operate. In particular, in order to maintain a clamping force and friction torque for a longer period of time (for example, during a decent on a slope or stopping on a hill), the electric motor actuating an electric brake needs to remain constantly energized to prevent a back driving effect through the actuator and therefore loss of the desired clamping force and braking torque. Prolonged energization of the motor may cause overheating of the motor and the associated motor controller due to continuous flow of electrical current.

A number of methods have been proposed to effect reliable braking in an electrically actuated brake system. The object of one example electric braking system is to minimize the load on the batteries for electric motor driven wheel brakes while still maintaining the braking action. This is achieved by supplying actuators of the wheel brakes of each vehicle axle or each vehicle diagonal with current from a separate voltage source, and by actuating the wheel brakes of the front axle before the brakes of the rear axle in at least one braking situation. However, this method may still require prolonged energization of the motor.

Another prior art brake actuator includes as part of the actuator a locking brake mechanism. The locking brake is so configured that the locking brake is without current in the "released state" as well as an "unreleased state" and, in this way, a second motor, which is assigned to the locking brake, consumes a negligible current. However, if the electric locking brake is unintentionally activated because of a technical error, or by the driver of the vehicle, this leads to a locking of the motor shaft of the electric motor of the brake actuator and the brake actuator can only then be actuated again when the electric locking brake is specifically released. An automatic release of the locking brake is not possible. In this way, malfunction of the brake actuator occurs when there is an unintended and unplanned activation of the locking brake.

It would be desirable to have a system that overcomes the above disadvantages.

SUMMARY OF THE INVENTION

One aspect of the present invention provides a rotary holding device including a rotor assembly including a plurality of teeth and a stator assembly including a plurality of teeth. The stator assembly teeth are positioned adjacent the rotor assembly teeth and a coil is positioned to allow a magnetic flux to align the rotor assembly teeth and the stator assembly teeth when the coil is energized to hold a motor shaft coupled to the device.

In other aspects of the present invention the rotor assembly and the stator assembly can include a steel material that has low magnetic remanence. The teeth of the rotor assembly and the teeth of the stator assembly can be separated by a gap of about 0.15 millimeters. The stator assembly can include a number of teeth equal to a number of teeth of the rotor assembly. The rotor assembly teeth can be of a size equal to the stator assembly teeth. An upper portion of the teeth of the rotor assembly can be gently convex. An upper portion of the teeth of the stator assembly may be gently concave. The teeth of the stator and the teeth of the rotor can be complementary. A pair of ball bearings can support the rotor assembly. End caps can support the ball bearings.

An aspect of the present invention includes a method of operating a rotary holding device in a motor driven brake caliper including energizing a coil of the rotary holding device, aligning rotary teeth and stator teeth of the rotary holding device, holding a motor shaft of the motor which is coupled to the rotary holding device and maintaining a clamping force on a brake rotor while the coil is energized.

Other aspects of the method of the present invention include de-energizing the coil to release the clamping force. The rotary teeth and stator teeth can be aligned by a magnetic flux. The coil can be energized with current at a level less than the current required for the motor to maintain a clamping force on the brake rotor. The clamping force can be maintained at a low noise level.

A further aspect of the present invention provides a brake rotor clamping system including means for generating magnetic flux, means for aligning rotor teeth and stator teeth, means for holding a motor shaft, and means for maintaining a clamping force on the brake rotor while the magnetic flux is generated.

Other aspects of the present invention further include means for stopping the magnetic flux to release the clamping force.

DESCRIPTION OF THE PREFERRED EMBODIMENT

Figure 1:
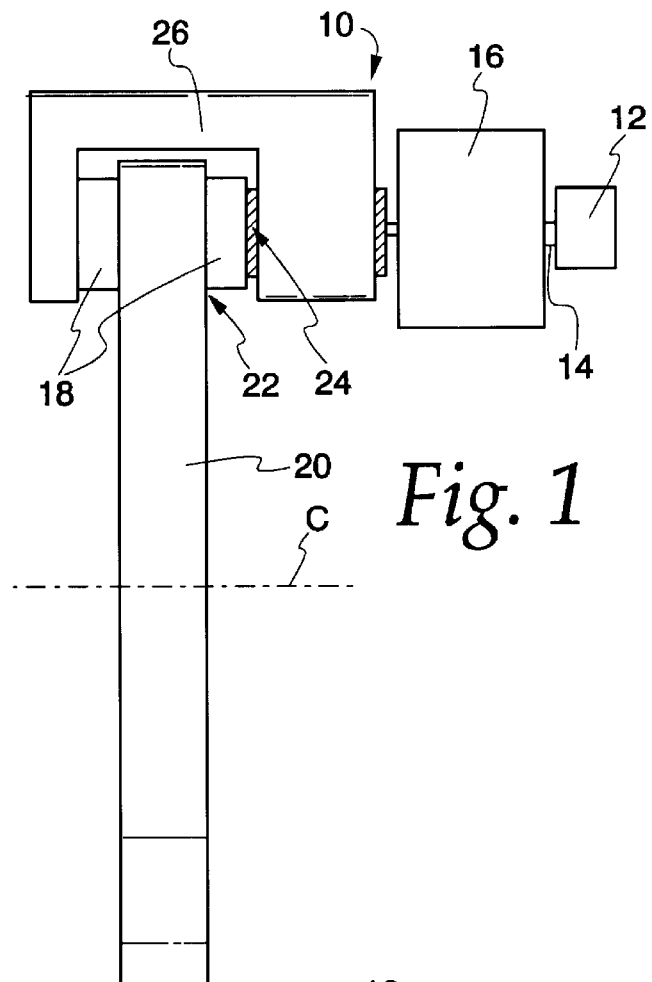
FIG. 1 is a depiction of an embodiment of the rotary holding device in combination with an electrically actuated brake system.

Referring to FIG. 1, a rotary holding device is provided for operation in combination with an electrically actuated brake system, shown generally at 10. The invention pertains to a rotary holding device 12 that generates a holding torque when energized with a DC current and reverts to near zero holding torque after the current has been removed. The device 12 is coupled to the shaft 14 of an electric motor 16. Activation of the device 12 permits de-energization of the motor 16 while allowing the motor shaft 14 to remain locked. The current required to generate the holding torque of this device 12 is significantly smaller than the current required to generate the same torque using the motor 16. In order to unlock the motor shaft 14, the holding device 14 is simply de-energized. Concurrently therewith, the motor 16 is brought back to its original or desired level.

No mechanical motion of internal parts and/or friction devices is involved while the device 12 is being operated. Instead, the holding torque is generated through the interaction of a magnetic field. Therefore, the device 12 is advantageous in that it generates no audible noise, draws less current than the motor 16, experiences little or no wear and increases overall reliability of the system 10.

The magnetic layout of the invention allow for a design that weighs less and occupies less volume than a conventional motor having the same torque rating. While other uses can be contemplated, the invention has particular application in an electro-mechanical vehicular brake system 10 in which a brake motor 16 activates the brake pads 18. Thus, it will be appreciated that during prolonged periods of time of brake activation, such as a stop at a railroad crossing, the device 12 provides the necessary holding torque at a current level that is much lower than the current level required for the motor 16 itself. Therefore, the current that is drawn from the vehicle electrical system (not shown) is reduced considerably, essentially reverting to a power conservation mode.

The device 12 is an improvement over other alternatives, such as an electro-mechanical brake device with friction plates or an electro-mechanical spring clutch. It lowers the electrical power consumption in an electro mechanical brake system and accomplishes the result in an essentially noiseless operation. Additionally, since electrical power consumption within the system 10 is reduced, the size and cost of the associated electro-mechanical brake motor 16 and power electronics can also be reduced.

Objects of the invention include the aforementioned noiseless operation. Additionally, there are no torque generating members necessary to accomplish the invention and backlash is negligible. The invention has further advantage in that a minimum number of parts are needed to accomplish the invention.

The brake system 10 of the present invention includes a rotary holding device 12 in a motor driven electric brake caliper application as shown. A brake rotor 20 is arranged about a wheel axle centerline C. A pair of brake pads 18 are arranged on each side of the brake rotor 20, at a peripheral portion 22 thereof. The brake pads 18 are held in place by a brake caliper housing 26. An electric servomotor 16 with a central motor shaft 14 is provided with a ballscrew drive 24. The ballscrew drive 24 is aligned with the brake pads 18 to urge the brake pads 18 into the rotor 20 to apply a frictional force thereto. The motor shaft 14 of the servomotor 16 connects to a rotary holding device 12, which when energized locks the motor shaft 14 in place, preventing the motor 16 from back-driving due to the stored clamping force in the brake caliper housing 26.

In operation, the servomotor 16 is energized to turn the ball screw 24. The ball screw 24 exerts a clamping force onto the brake pads 18 causing the brake pads 18 to clamp the rotor 20 to create a desired level of braking (friction torque) on the brake rotor. In order to avoid an overheating effect, the rotary holding device 12 is energized after the clamping force has reached a desired predetermined level. The motor shaft 14 is locked in place by the holding device 12 and therefore the clamping force is maintained. To release the system 10, the rotary holding device 12 is de-energized while the motor 16 is re-energized to maintain control over the desired brake clamping force.

Figure 3:
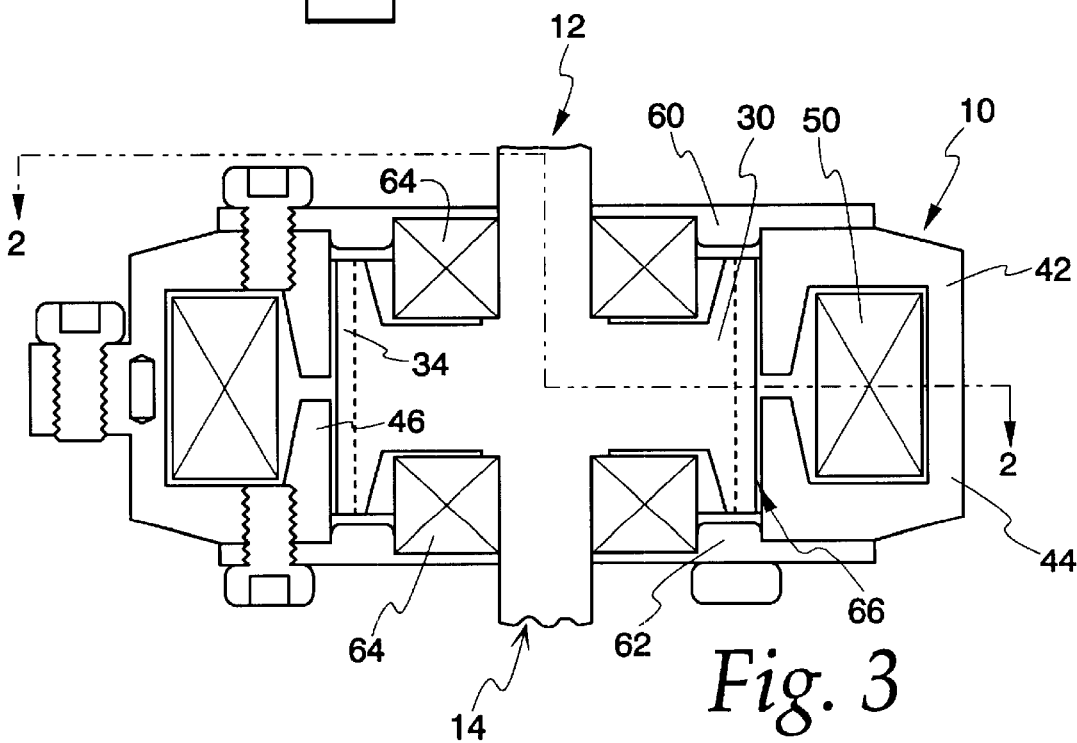
FIG. 3 is a cross sectional view of the rotary holding device of FIG. 2 through lines 3—3.
Figure 2:
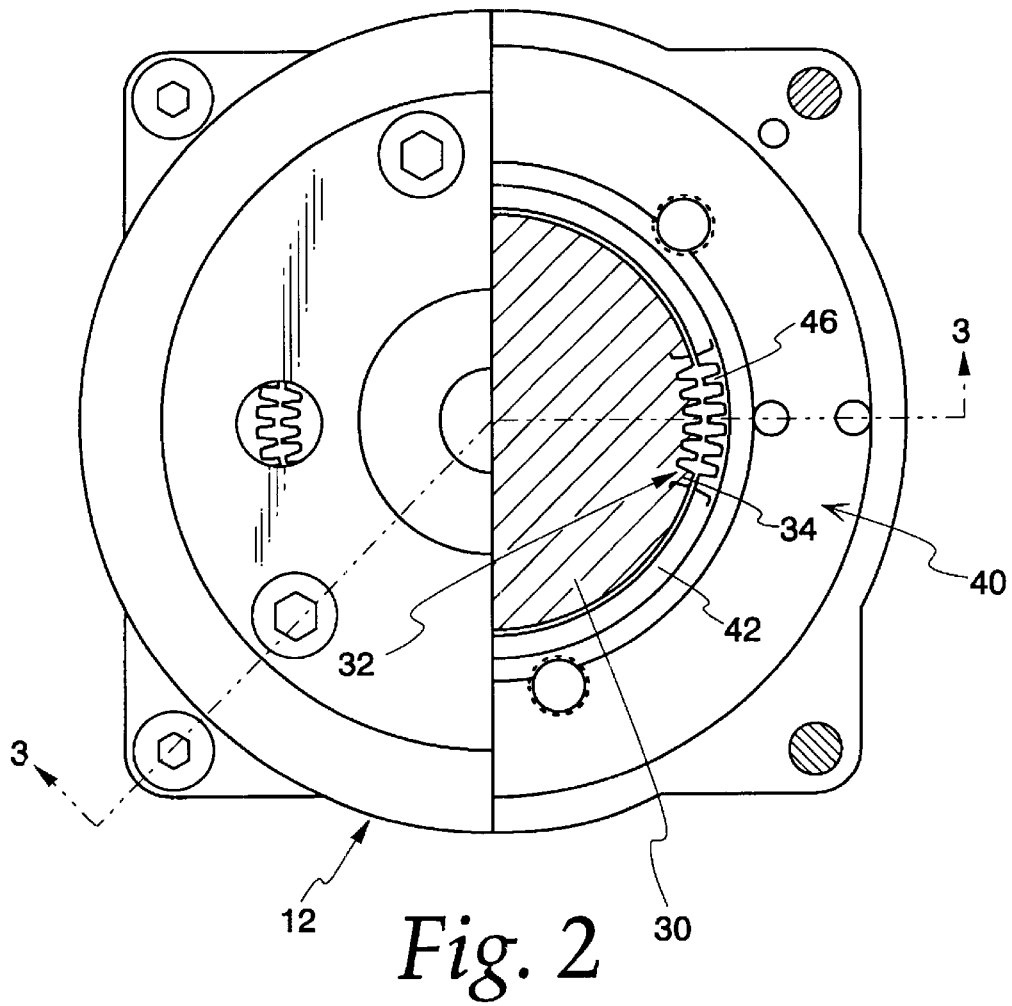
FIG. 2 is a partial cutaway view of one embodiment of the present invention.
Figure 4:
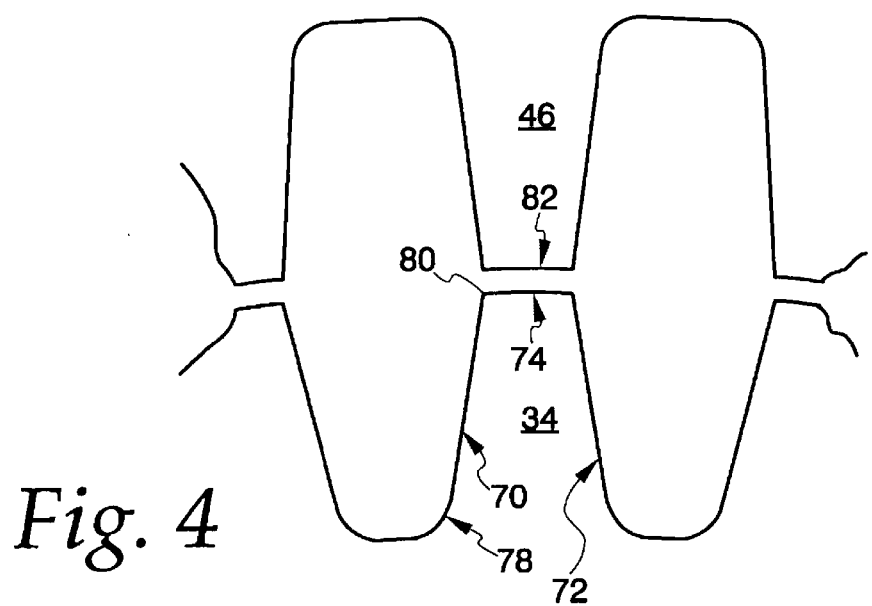
FIG. 4 is an enlarged view of the rotor teeth and the stator teeth of an embodiment of the present invention.

Referring to FIGS. 2–4, one embodiment of an electrically controlled holding device of the present invention is shown generally at numeral 12. The rotary holding device 12 can include three main parts. These parts include a cylindrical rotor assembly 30, a stator assembly 40, and a coil assembly 50. Cylindrical rotor assembly 30 is preferably made from a mild steel material and can be supported on two bearings 64. The outer circumference 32 of the rotor assembly 30 can include a plurality of teeth 34. In one embodiment, the rotor assembly 30 includes 60 evenly spaced teeth 34.

Stator assembly 40 can also be made from a mild steel material, formed as two similar halves 42, 44. Each half 42, 44 can have an identical set of teeth 46 that line up with each other when the stator 40 is assembled. The teeth 46 may be the same size as the rotor teeth 34. In one embodiment, the teeth 34 of the rotor assembly 30 can be formed to cooperate with the teeth 46 of the stator assembly 40. When coil assembly 50 is energized, a magnetic flux closes through both the rotor teeth 34 and stator teeth 46 and creates rotary forces that cause each of the rotor teeth 46 to align with their counter part rotor teeth 34 on the stator 30.

The teeth 34 of the rotor 30 can include a pair of straight sides 70, 72 meeting at a substantially straight upper portion 74. The upper portion 74 of each tooth 34 may be convex. The point where the sides 70, 72 of the tooth 34 join the upper portion 74 may be a sharply formed corner 80. Arcuate root 78 may separate the tooth 34 of the rotor 30. The teeth 46 of the stator 40 are similar to the teeth 34 of the rotor 30. Preferably, the upper portion 82 of the tooth 46 has a complementary configuration to that of the upper portion 74. In other words, if upper portion 74 is gently convex, upper portion 82 is correspondingly concave.

Two end caps 60, 62 can hold ball bearings 64, such that a narrow gap 66, preferably about 0.15 millimeters, is established between rotor 30 and stator 40. Any external torque that acts upon rotor assembly 30, including those caused by tooth alignment forces, can be counteracted by a magnetic coil 50 in the stator 40. The rotor 30 therefore remains locked as long as the coil 50 is energized and the maximum holding force of the device 12 is not exceeded. In one embodiment, both the stator 40 and the rotor 30 can be made from a material that has very low magnetic remanence. This assures that the magnetic flux returns to zero immediately after the coil 50 has been de-energized. It will be understood that any residual flux would cause an undesirable residual holding torque.

The present invention can be incorporated into an electric motor or actuator that is used as a brake system actuator. In an alternate embodiment, the present invention can be a separate device that may be used in combination with an electrical brake actuator.

While the embodiments of the invention disclosed herein are presently considered to be preferred, various changes and modifications can be made without departing from the spirit and scope of the invention. The scope of the invention is indicated in the appended claims, and all changes that come within the meaning and range of equivalents are intended to be embraced therein.

What is claimed is:

1. A rotary holding device comprising:
   rotor assembly including a plurality of teeth;
   stator assembly including a plurality of teeth, the stator assembly teeth positioned adjacent the rotor assembly teeth; and
   coil positioned to generate a magnetic flux to align the rotor assembly teeth and the stator assembly teeth tip to tip when the coil is energized to hold a motor shaft coupled to the device.

2. The device of claim 1 wherein the rotary holding device is used to hold a motor shaft of a motor in an electrically actuated brake system for a vehicle.

3. The device of claim 1 wherein the stator assembly includes a number of teeth equal to a number of teeth of the rotor assembly.

4. The device of claim 3 wherein the rotor assembly teeth are of a size equal to the stator assembly teeth.

5. The device of claim 3 wherein an upper portion of the teeth of the rotor assembly are gently convex.

6. The device of claim 5 wherein an upper portion of the teeth of the stator assembly are gently concave.

7. The device of claim 6 wherein the upper portions of the teeth of the stator and the teeth of the rotor are complementary.

8. The device of claim 1 further comprising a pair of ball bearings supporting the rotor assembly.

9. The device of claim 8 wherein the ball bearings are supported by end caps.

10. A rotary holding device comprising:
    rotor assembly including a plurality of teeth;
    stator assembly including a plurality of teeth, the stator assembly teeth positioned adjacent the rotor assembly teeth; and
    coil positioned to allow a magnetic flux to align the rotor assembly teeth and the stator assembly teeth when the coil is energized to hold a motor shaft coupled to the device;
    wherein the teeth of the rotor assembly and the teeth of the stator assembly are separated by a gap of about 0.15 millimeters.

11. A method of operating a rotary holding device in a motor driven brake caliper comprising:
    energizing a coil of the rotary holding device;
    aligning tip to tip rotary teeth and stator teeth of the rotary holding device to magnetic flux;
    holding a motor shaft of the motor which is coupled to the rotary holding device;and
    maintaining a clamping force on a brake rotor while the coil is energized.

12. The method of claim 11 further comprising:
    de-energizing the coil to release the clamping force.

13. The method of claim 11 wherein the coil is energized with current at a level less than the current required for the motor to maintain a clamping force on the brake rotor.

14. The method of claim 11 wherein the clamping force is maintained at a low noise level.

15. A brake rotor clamping system comprising:
    means for generating magnetic flux;
    means for aligning rotor teeth and stator teeth tip to tip by the magnetic flux;
    means for holding a motor shaft; and
    means for maintaining a clamping force on the brake rotor while the magnetic flux is generated.

16. The system of claim 15 further comprising:
    means for stopping the magnetic flux to release the clamping force.

* * * * *